United States Patent
Beck

(10) Patent No.: US 8,616,092 B2
(45) Date of Patent: Dec. 31, 2013

(54) DEVICE AND METHOD FOR ALIGNING AND INSERTING A THREADED FASTENER

(75) Inventor: Joseph L. Beck, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 13/072,887

(22) Filed: Mar. 28, 2011

(65) Prior Publication Data

US 2012/0246938 A1 Oct. 4, 2012

(51) Int. Cl.
*B25B 13/00* (2006.01)
*B25B 21/00* (2006.01)
*B25B 13/48* (2006.01)

(52) U.S. Cl.
USPC .................................. 81/55; 81/54

(58) Field of Classification Search
USPC ........................................ 81/54, 55
See application file for complete search history.

(56) References Cited

U.S. PATENT DOCUMENTS

| | | | |
|---|---|---|---|
| 1,260,698 A | 3/1918 | Moore et al. | |
| 1,426,682 A | 8/1922 | Snell | |
| 4,358,971 A | 11/1982 | Favonio | |
| 4,827,598 A | 5/1989 | Sakamoto et al. | |
| 5,014,405 A | 5/1991 | Yamana et al. | |
| 5,332,181 A * | 7/1994 | Schweizer et al. | 248/123.11 |
| 6,973,856 B2 * | 12/2005 | Shibata | 81/57.4 |
| 7,055,408 B2 * | 6/2006 | Sasaki | 81/54 |

FOREIGN PATENT DOCUMENTS

JP    2005-280588 A    10/2005

* cited by examiner

*Primary Examiner* — Monica S. Carter
*Assistant Examiner* — Danny Hong
(74) *Attorney, Agent, or Firm* — Standley Law Group LLP

(57) ABSTRACT

A device and method for aligning and inserting a threaded fastener into a threaded hole. The device contains a base and a rail extending up from the base. A gearbox may be attached to the rail such that the gearbox can travel along the rail between a fastener loading position, a fastener install position, and a fastener realigning position. A socket assembly is connected to or otherwise associated with the gearbox and includes a drive socket that is adapted to accept the threaded fastener and an input shaft which is adapted to translate rotational motion to the output socket. A spring mechanism is attached to the gearbox and contains a spring that will compress when the gearbox travels into the fastener realigning position. A compressible washer may be interposed between the output shaft and the drive socket of the socket assembly so that the central axes of these components may be misaligned without causing damage or disrupting the alignment process.

12 Claims, 5 Drawing Sheets

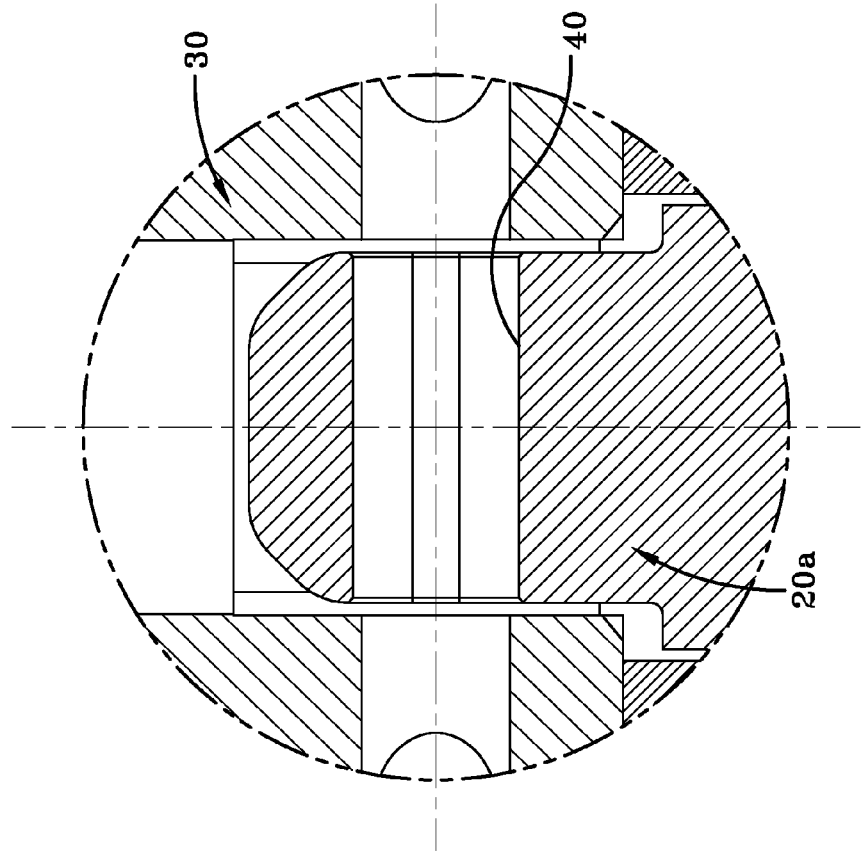
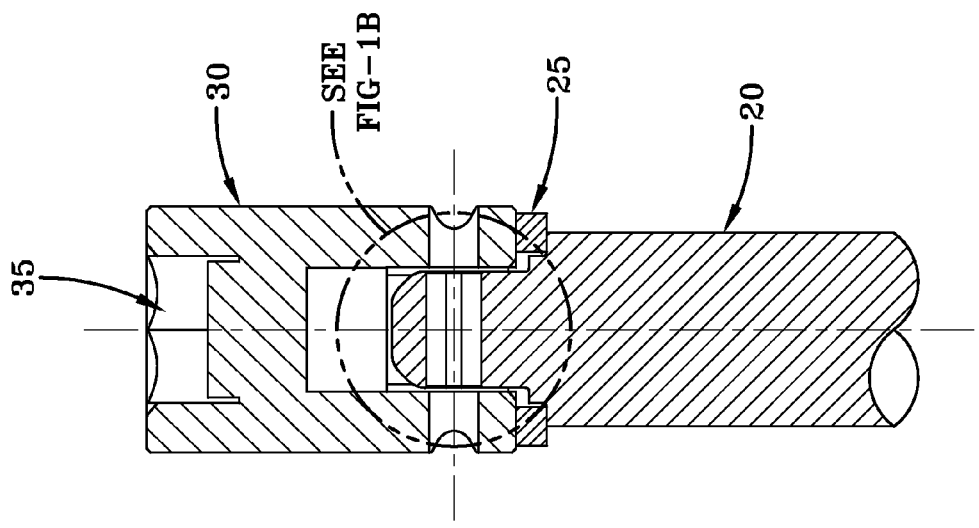
FIG-1B
FIG-1A

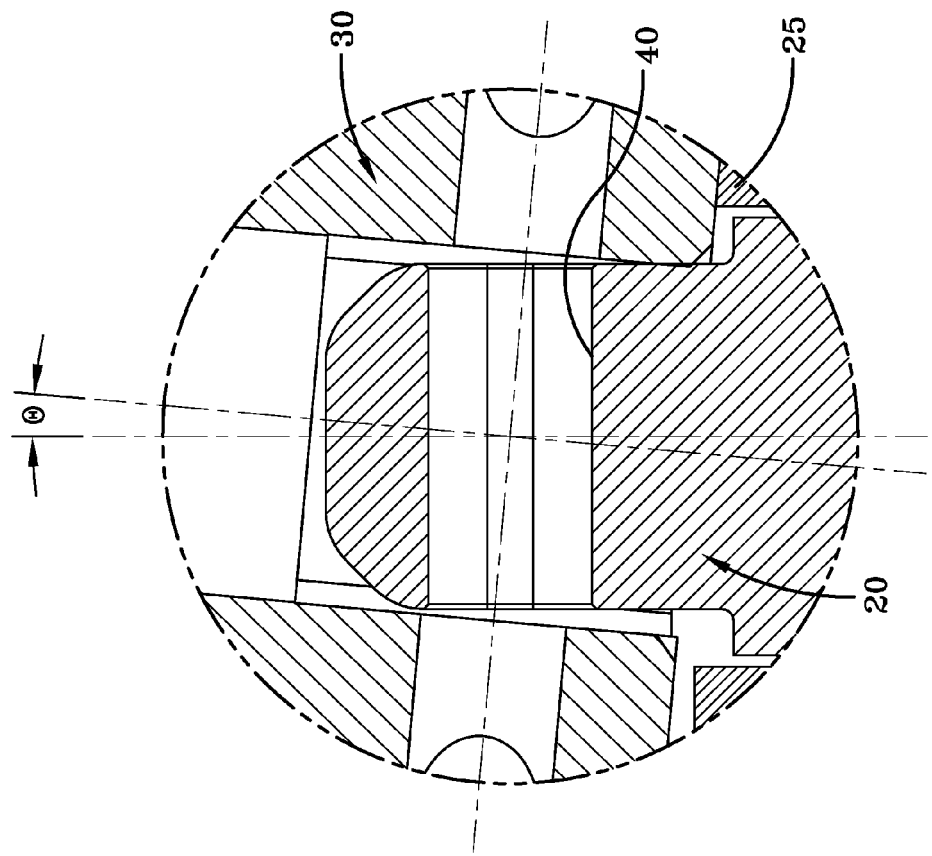
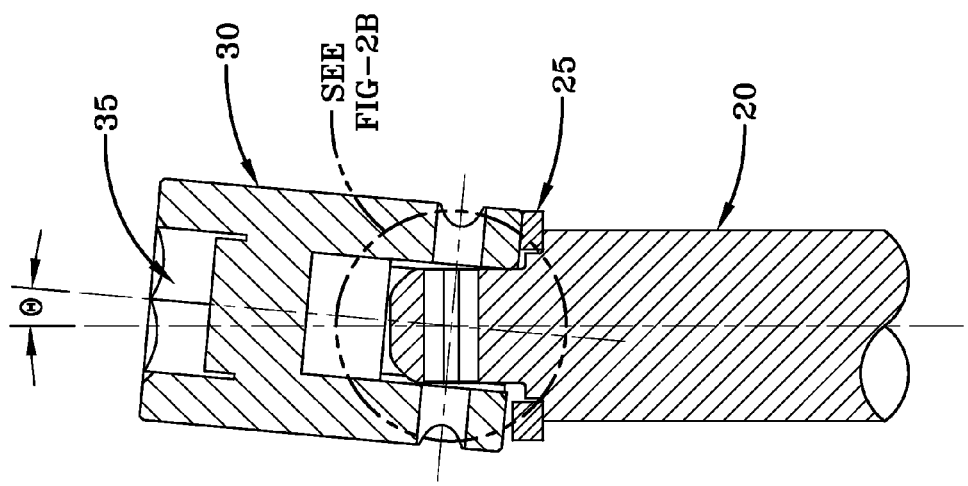
FIG-2B
FIG-2A

DEVICE AND METHOD FOR ALIGNING AND INSERTING A THREADED FASTENER

TECHNICAL FIELD

The embodiments herein are generally directed to a device and method for installing, and in some cases re-aligning, a threaded fastener into a like-threaded receiving aperture.

BACKGROUND

During various manufacturing or other processes, it may be necessary to install a threaded fastener into a like-threaded receiving aperture. In some cases, the threaded fastener may need to be realigned with the receiving aperture following its initial placement in a fastener driving element due to some type of movement or other cause of misalignment between the threaded fastener and the threaded receiving hole. In this case, it may be desirable or necessary to retract the fastener driving element or some other portion of a corresponding fastener driving mechanism so that the threaded fastener may be realigned and then properly installed.

One exemplary operation where such a fastener installation process is required involves installing a vehicle suspension to a vehicle body. In a known embodiment, a pallet supports the suspension in the correct position relative to the body and then the suspension is fastened to the body via several bolts. A machine is used to lift the pallet and hold the pallet in a proper installation position. The machine includes a number of nut runners and corresponding offset nut runner gear boxes. Once the pallet is properly positioned, the nut runners extend upward to engage the nut runner gearboxes, which are subsequently driven by the nut runners.

The gearboxes each include a socket on an opposite side from the side that the nut runners engage. A bolt is placed into each of these sockets prior to the raising of the pallet into the installation position. In some cases, one or more of the bolts may be knocked out of position in between the time the bolts are loaded into the sockets and the time the pallet is raised. In such a case, the now misaligned bolt(s) will need to be realigned.

In light of this problem, each socket of the known suspension installation machine contains a spring-loaded mechanism that allows the associated socket to be moved downward in order to create sufficient space for an operator to realign mis-set or misaligned bolts in the socket. This downward movability of the sockets is necessary because the suspension is far too heavy to be lifted by an operator. Hence, the socket needs to be moved downward in order to create sufficient bolt realignment space.

Because the known design locates the spring-loaded mechanisms in/on the socket and above the associated gearboxes, the spring-loaded mechanisms are compressed every machine cycle upon extension of the nut runners. This results in a high cost and low reliability, which is also compounded by the number of overall parts involved.

Therefore, it can be understood that an improved device that allows for the realignment of a misaligned bolt prior to installation would be advantageous. The design of the present invention eliminates the complexity and shortcomings of the known device through the use of a novel socket design and through relocation of the spring mechanism away from the socket and along the bottom of the gearbox.

SUMMARY OF THE GENERAL INVENTIVE CONCEPT

The embodiments described herein are illustrative of devices for aligning and inserting a threaded fastener into a threaded hole. An exemplary embodiment of the device contains a base and a rail extending up from the base. A gearbox may be attached to the rail such that the gearbox can travel along the rail from a fastener loading position up to a fastener install position or down to a fastener realigning position.

A socket assembly is preferably coupled to the gearbox. The socket assembly has a drive socket that is adapted to accept the threaded fastener and an input shaft that is adapted to transfer rotational motion to the drive socket. Rotational motion of the input shaft may be produced by, for example, a nut runner device.

A spring mechanism is preferably associated with the gearbox and contains a spring element that may be compressed to permit placement of the gearbox in a fastener realigning position. A compressible washer may be placed between the output shaft and the output socket of the socket assembly so that the central axes of these components may be misaligned without causing damage or disrupting the alignment process.

Exemplary embodiments of a device of the present invention may be used to install the fasteners that secure a vehicle suspension to a vehicle body. In an exemplary embodiment, the spring within the spring mechanism is only compressed when the gearbox is placed in the fastener realigning position. Thus, the cyclical loading of the spring is reduced, which increases the lifespan and decreases the servicing or downtime of the device.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1A is a front sectional view of one embodiment of an output shaft and output socket of a fastener installation device of the present invention, where the central axes of the output shaft and output socket are aligned;

FIG. 1B is an enlarged view of DETAIL 1B, as indicated in FIG. 1A;

FIG. 2A shows the output shaft and output socket of FIGS. 1A-1B with the central axes of the output shaft and output socket misaligned;

FIG. 2B is a detail view of DETAIL 2B indicated in FIG. 2A;

DETAILED DESCRIPTION OF EXEMPLARY EMBODIMENT(S)

Figure 3A:
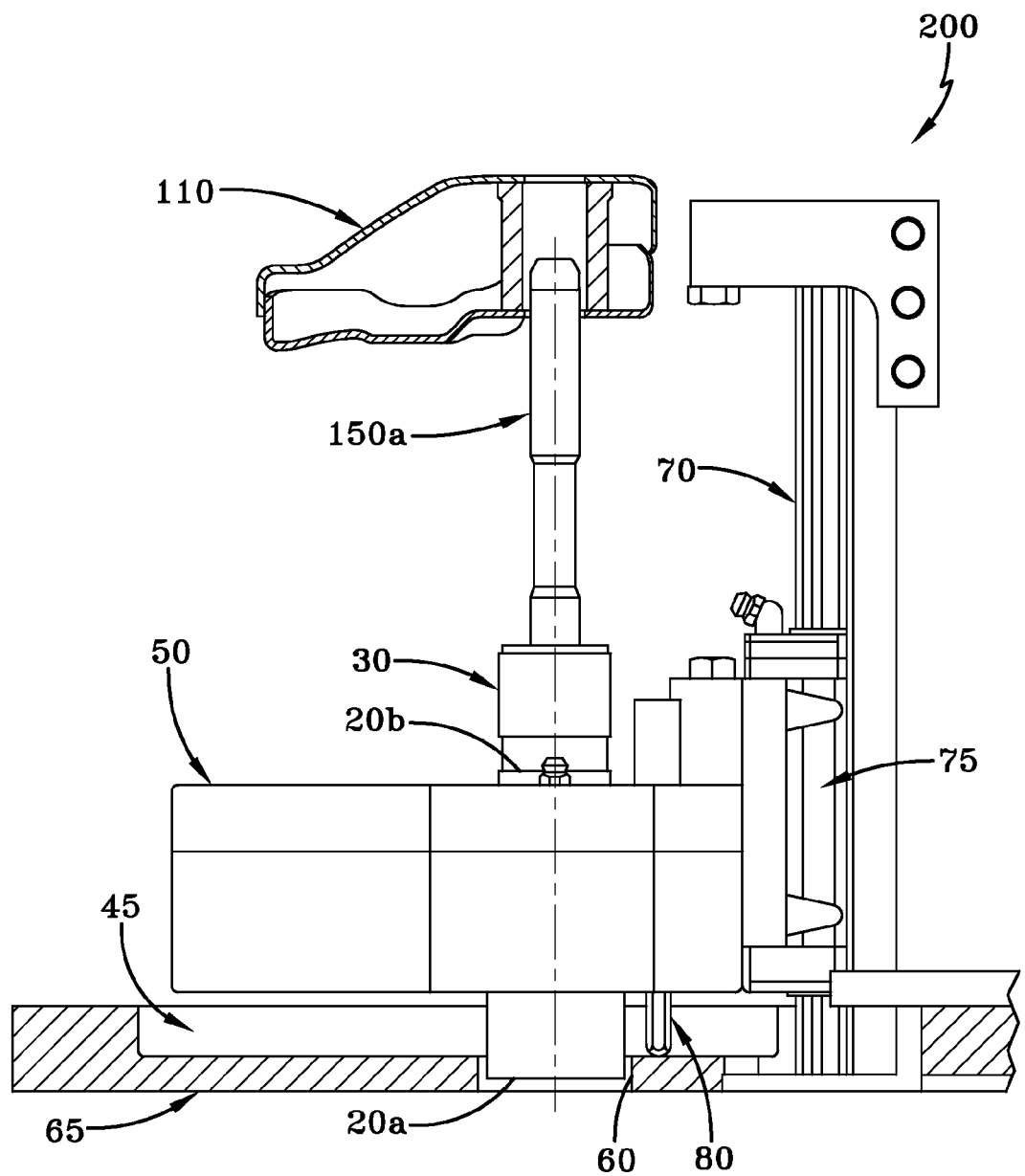
FIG. 3A is a partial section view illustrating an exemplary device for aligning and inserting a threaded fastener through a vehicle suspension where a gearbox portion of the device is shown in a loading position.

FIG. 1A is a front sectional view of one embodiment of an output shaft 20 and a socket 30 that are associated with a gearbox 50 (see FIGS. 3A-3C) of a fastener installation device according to the present invention, where the central axes of the output shaft 20 and drive socket 30 are aligned. The top portion of the socket 30 contains a receptacle 35 for accepting a threaded fastener (not shown in this figure). A compressible washer 25 is preferably located between the output shaft 20 and the socket 30. As will be shown and explained in further detail below, the compressible washer 25 allows for the central axis of the output shaft 20 and the central axis of the socket 30 to be misaligned, such that a misaligned fastener may still be installed without damaging the threads of an associated receiving aperture. In an exemplary embodiment, the compressible washer 25 may be comprised of an elastic material, such as a flexible urethane or nylon plastic. In other embodiments, the compressible washer may be comprised of, for example, a spring metal, an elastomer, or a composite material.

FIG. 1B is an enlarged view of DETAIL 1B as indicated in FIG. 1A. In this view, a slot 40 can be seen to pass through both the input shaft 20 and the socket 30. A rigid coupling member such as a pin (not shown) may be placed in this slot to retain the socket 30 on the output shaft 20.

FIG. 2A is a front sectional view showing the output shaft 20 and drive socket 30 with the central axes for the output shaft 20 and drive socket 30 are misaligned by angle θ.

FIG. 2B is an enlarged view of DETAIL 2B as indicated in FIG. 2A. As shown in this view, the misalignment between the central axis of the output shaft 20 and the central axis of the drive socket causes the compressible washer 25 to be compressed. The compression of the washer 25 may prevent damage to the output shaft 20 and/or the socket 30 when a threaded faster is installed while the axes of these elements are misaligned.

FIG. 3A is a partial section view showing one portion of an exemplary device 200 for aligning and inserting a threaded fastener 150a through a mounting hole in a vehicle suspension component 110 to secure the suspension to a vehicle body (not shown). The device 200 includes a gearbox 50 equipped with the output shaft 20 and drive socket 30 of FIGS. 1A-2B. The gearbox 50 is depicted in FIG. 3A in a fastener loading position.

Figure 3B:
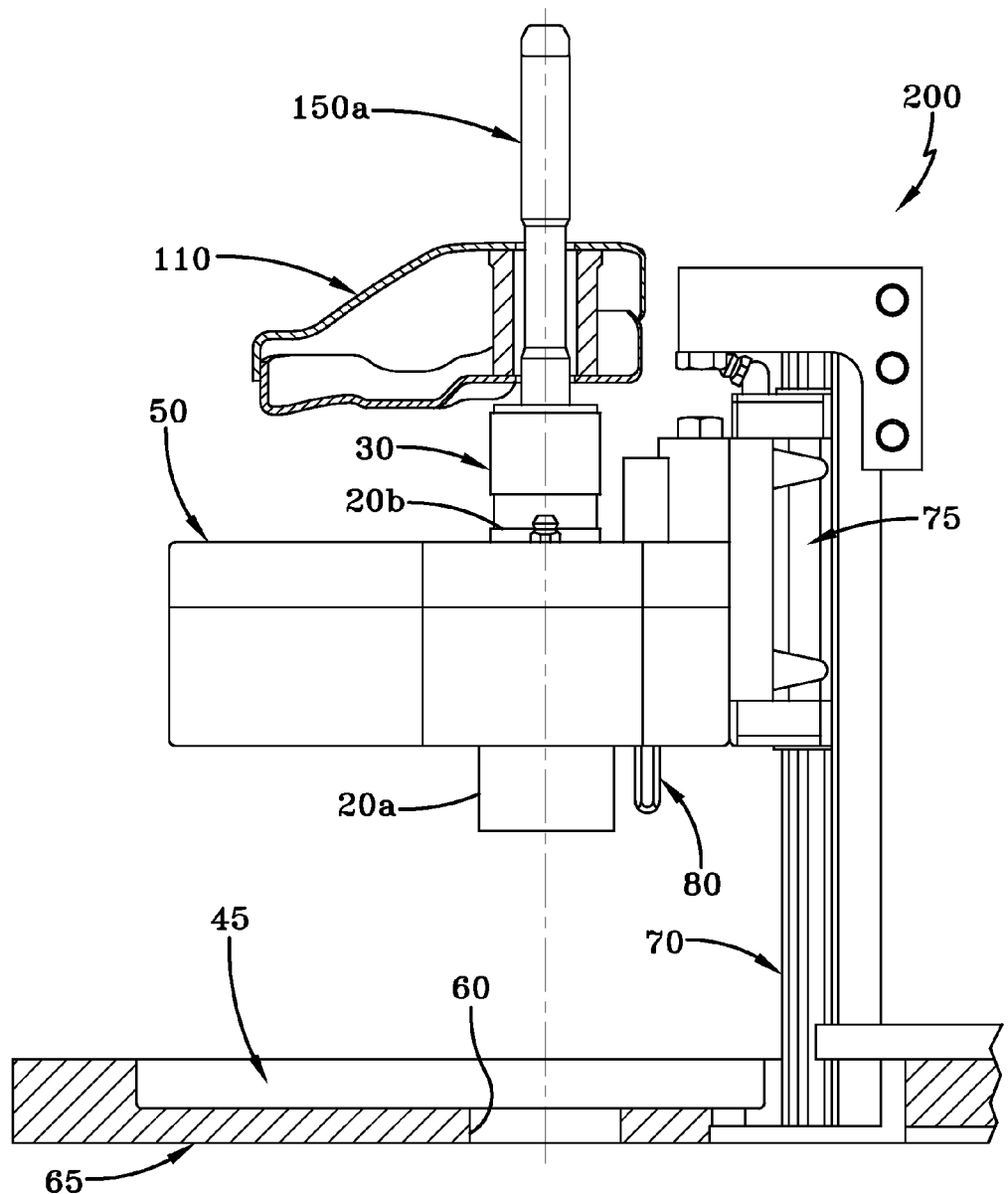
FIG. 3B is a partial section view of the device of FIG. 3A with the gearbox portion shown in an install position.
Figure 3C:
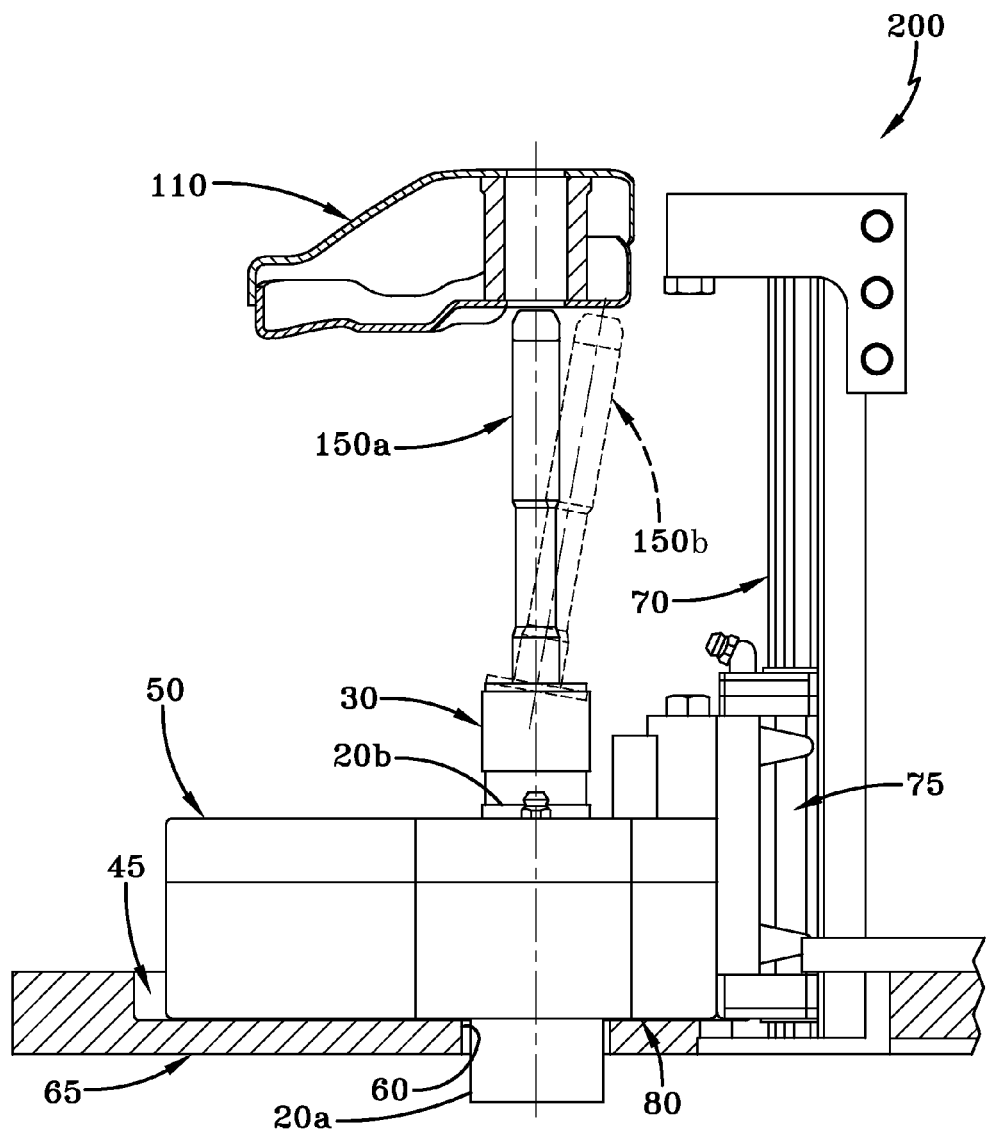
FIG. 3C is a partial section view of the device of FIGS. 3A-3B with the gearbox in a realign position, which creates sufficient space for an operator to realign a misaligned fastener.

In this embodiment of the device 200, a base 65 serves as a mounting element for other components. A guiderail 70 extends upward from the base 65. A gearbox 50 is attached to the guiderail 70 by a linear bearing 75 such that the gearbox 50 can travel along the guiderail 70 and through several positions—including but not necessarily limited to a fastener loading position (as shown in FIG. 3A), an install position (as shown in FIG. 3B), and a fastener realigning position (as shown in FIG. 3C). An input end 20a of the output shaft 20 extends downward from a bottom surface of the gearbox 50. A spring mechanism 80 is also preferably attached to or located within the gearbox 50 such that at least a portion of the spring mechanism 80 extends below the gearbox 50.

The base 65 includes a gearbox receiving cavity 45. An opening 60 extends downward from a bottom of the receiving cavity 45, and may extend through the base 65 as shown here. The opening 60 is dimensioned to accept the extending input end 20a of the output shaft 20 when the gearbox 50 is placed in a fastener realigning position, as is shown in FIG. 3C and described in more detail below. The output shaft 20 is supported by the gearbox and the socket 30 is connected to the output end 20b of the output shaft 20, such as via a square drive end and receiving cavity or by any known technique that would be understood by one of skill in the art. The receptacle 35 in the socket 30 is of a size to properly accept a head portion of a desired threaded fastener 150a.

FIG. 3B is a partial section view showing the device 200 of FIG. 3A located in an install position, where the gearbox 50 may be rotationally driven to install the threaded fastener 150a into a complementarily-threaded hole in a vehicle body. The gearbox 50 is linearly displaced along the guiderail and rotationally driven by a moveable nut runner (not shown) that is positioned beneath the base 65 and is moveable to contact and engage the input shaft 20a of the gearbox. In the schematically-illustrated install position of FIG. 3B, the gearbox 50 has travelled upward along the guiderail 70 so as to pass the threaded fastener 150a through an aperture in the suspension component 110. As would be apparent to one of skill in the art, the threaded portion of the fastener 150a would be engaged with a complementarily-threaded hole in a vehicle body when the gearbox 50 resides in the position of FIG. 3B.

Although the threaded fastener 150a may still be installed if the central axes of the output shaft 20 and drive socket 30 are somewhat misaligned, it has been found that once the gearbox 50 has reached the install position, the threaded fastener 150a may be so misaligned with the aperture in the suspension component 110 or the threaded receiving hole in the vehicle body, that the threaded fastener cannot be installed into the threaded receiving hole. In this case, the present invention allows the gearbox 50 to be returned to a fastener realigning position, as illustrated in FIG. 3C.

In the fastener realigning position of the gearbox 50 shown in FIG. 3C, the aforementioned nut runner has been retracted downward. In certain embodiments, it may be possible to use the nut runner to move the gearbox 50 into the fastener realigning position. Alternatively, the nut runner may become disengaged from the input shaft 20a prior to the gearbox 50 reaching the fastener realigning position, in which case the gearbox 50 may be moved into the fastener realigning position by an operator.

In the partial section view of FIG. 3C, reference number 150a represents the threaded fastener in a properly aligned orientation, while reference number 150b represents the threaded fastener in an orientation that is sufficiently misaligned so as to require realignment (typically by an operator). When in the fastener realigning position, it can be observed that the bottom of the gearbox 50 resides in the cavity 45 in the base 65 and the extending input end 20a of the output shaft 20 may enter the opening 60 in the base 65. The bottom surface of the gearbox 50 may or may not make actual contact with the bottom of the cavity 45. Further, as the gearbox 50 is moved into the fastener realigning position, a portion of the spring mechanism 80 that extends below the gearbox 50 contacts the bottom of the cavity 45, which partially or fully compresses a spring element 90 of the spring mechanism.

It can be understood from FIG. 3C that moving the gearbox into this fastener realigning position allows the misaligned fastener 150b to be realigned 150a with the aperture in the suspension component 110 and with a threaded receiving hole in the vehicle body. This realignment process may occur without any change or adjustment to the position of the suspension component 110 or the vehicle body. Because the gearbox 50 is only placed in the position of FIG. 3C when a fastener realignment is necessary, and not during every fastener installation operation, the number of compressions of the spring element 90 is greatly reduced in comparison to the spring element of the previously described known device.

Figure 4:
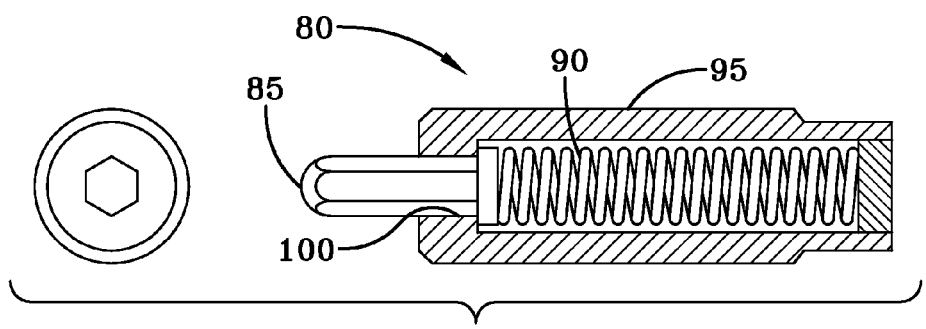
FIG. 4 is a section view of an exemplary spring mechanism that may be associated with a gearbox of a fastener installation device according to the present invention.

An exemplary spring mechanism 80 for use with a fastener installation device according to the present invention is depicted in FIG. 4. In this exemplary embodiment, the spring element 90 is substantially enclosed within a housing 95. A pass-through hole 100 through a lower end of the housing 95 allows a rigid contact element (e.g., pin) 85 extend from the housing 95.

As can be observed in FIGS. 3A-3B, the pin 85 extends from the bottom of the gearbox 50 when the spring mechanism 80 is installed to the gearbox 50. As the gearbox 50 moves into the cavity 45 in the base 65, contact of the pin 85 with the bottom of the cavity 45 compresses the spring element 90 and moves the pin into the housing 95. Although a single compression spring is shown in this figure, it should be noted that any number of springs and types of springs may be used. Further embodiments can also utilize hydraulic cylinders, elastomeric elements, etc, rather than the coil spring 90 shown in FIG. 4.

Referring back to FIG. 3A, it can also be seen that the spring mechanism 80 functions to maintain the gearbox 50 in the fastener loading position in a static condition. The spring element 90 may be in an uncompressed or partially compressed state when the gearbox 50 is in the fastener loading position. In this way, the spring 90 is only substantially compressed when the gearbox 50 is placed in the fastener realigning position. Thus, the cyclical loading of the spring element 90 is limited, which increases the lifespan of the spring element 90 and reduces downtime and maintenance costs of the device 200.

While certain embodiments of the present invention are described in detail above, it is to be understood that the scope of the invention is not to be considered limited by such disclosure, and modifications are possible without departing from the spirit of the invention as evidenced by the following claims:

What is claimed is:

1. A device for aligning and inserting a threaded fastener comprising:
    a base;
    a guide rail extending up from the base;
    a gearbox attached to the rail such that the gearbox can travel along the rail between a fastener loading position, a fastener installation position, and a fastener realigning position;
    a socket assembly coupled to the gearbox and having a drive socket that is adapted to accept the threaded fastener and an output shaft adapted to translate rotational motion to the drive socket;
    a spring mechanism attached to the gearbox, the spring mechanism including a spring and a contact element that extends from a bottom of the gear box and exerts a compressive force on the spring when the gearbox is moved into the fastener realigning position.

2. The device of claim 1 further comprising a compressible washer interposed between the drive socket and the output shaft of the socket assembly.

3. The device of claim 2 wherein the compressible washer is comprised of an elastic material.

4. The device of claim 1 further comprising a linear bearing located between the guiderail and the gearbox.

5. The device of claim 1 further comprising an opening in the base adapted to receive at least a portion of an input end of said output shaft as the gearbox moves into the fastener realigning position.

6. The device of claim 1 wherein the spring mechanism further comprises:
    a housing enclosing the spring, the housing having an opening through which the contact element extends,
    wherein the spring is located between the contact element and a back wall of the housing.

7. The device of claim 1 wherein the spring is in an uncompressed state when the gearbox is in the loading and install positions.

8. The device of claim 1 wherein rotational motion of the output shaft is produced by a nut runner that engages an input end of the output shaft from a location below the gearbox.

9. A device for aligning and inserting a threaded fastener comprising:
    a base having an opening;
    a guide rail extending substantially vertically upward from the base;
    a linear bearing attached to the rail;
    a gearbox attached to the linear bearing such that the gearbox can travel along the rail between a fastener loading position, a fastener installation position, and a fastener realigning position;
    a socket assembly connected to the gearbox, the socket assembly including an output shaft with an output end coupled to a drive socket above the gearbox and an input end extending below the gearbox and adapted to engage a drive end of a nut runner and to transfer rotational motion of the nut runner to the drive socket; and
    a spring mechanism attached to the gearbox, the spring mechanism including
        a housing having an opening and a back wall,
        a rigid contact element with a first end extending out of the opening of the housing and below the gearbox, and
        a compression spring located between a second end of the contact element and the back wall of the housing;
    wherein, when the gearbox is moved to the fastener realigning position, the input end of the output shaft enters the opening in the base and contact between the rigid contact element and the base produces a compressive force on the spring.

10. The device of claim 9 further comprising a compressible washer interposed between the output socket and the output shaft.

11. The device of claim 10 wherein the compressible washer is comprised of an elastic material.

12. The device of claim 9 wherein the spring is in an uncompressed state when the gearbox is in the loading and install positions.

* * * * *